United States Patent
Pearcy et al.

(10) Patent No.: US 10,031,646 B2
(45) Date of Patent: Jul. 24, 2018

(54) COMPUTER SYSTEM SECURITY DASHBOARD

(75) Inventors: Derek Patton Pearcy, San Francisco, CA (US); Jessica Anne Heinrich, Tacoma, WA (US); Craig Anthony Phillips, Swindon (GB)

(73) Assignee: McAfee, LLC, Santa Clara, CA (US)

( * ) Notice: Subject to any disclaimer, the term of this patent is extended or adjusted under 35 U.S.C. 154(b) by 284 days.

(21) Appl. No.: 13/340,010

(22) Filed: Dec. 29, 2011

(65) Prior Publication Data

US 2013/0061169 A1 Mar. 7, 2013

Related U.S. Application Data

(60) Provisional application No. 61/531,936, filed on Sep. 7, 2011.

(51) Int. Cl.
*G06F 3/0484* (2013.01)
*G06F 21/50* (2013.01)
(Continued)

(52) U.S. Cl.
CPC .......... *G06F 3/0484* (2013.01); *G06F 11/328* (2013.01); *G06F 21/50* (2013.01); *G06F 21/552* (2013.01)

(58) Field of Classification Search
CPC . G06F 3/00–3/05; G06F 11/328; G06F 21/50; G06F 21/552; G06F 21/577; G06F 21/56; H04L 63/1416; H04L 41/22
(Continued)

(56) References Cited

U.S. PATENT DOCUMENTS 5,987,610 A 11/1999 Franczek et al.
6,008,809 A * 12/1999 Brooks .................. 715/792
(Continued)

FOREIGN PATENT DOCUMENTS

CN 101529366 A 9/2009
CN 101739526 A 6/2010
WO 2013/036784 A1 3/2013

OTHER PUBLICATIONS

Information Technology Risk Management, Copyright 2002, © Glen B. Alleman, Niwor, Colorado, 22 pages.
(Continued)

*Primary Examiner* — Nicholas Ulrich
(74) *Attorney, Agent, or Firm* — Patent Capital Group

(57) ABSTRACT

A computing system security dashboard is provided for presentation on a computer display device, the dashboard including a plurality of security view panes. Each security view pane, when expanded, presents a respective visualization of security conditions of a particular computing system. When the particular security view pane is collapsed it can hide at least a portion of particular visualizations of security conditions presented using the particular security view pane when expanded. The particular security view pane occupies a smaller area of the dashboard when collapsed than when expanded. A particular visual indicator is presented on the particular security view, at least when collapsed, summarizing at least a portion of the particular security conditions identified in the particular visualizations. A user interaction with the particular collapsed security view pane can prompt the particular security view pane to be expanded in area and present the particular visualizations.

28 Claims, 10 Drawing Sheets

(51) Int. Cl.
  *G06F 11/32* (2006.01)
  *G06F 21/55* (2013.01)
(58) Field of Classification Search
  USPC ............... 715/735–737, 759, 781, 783, 788,
         715/791–793, 795, 796, 800, 801;
                  726/2–26
  See application file for complete search history.

(56) References Cited

U.S. PATENT DOCUMENTS

| | | | |
|---|---|---|---|
| 6,073,142 | A | 6/2000 | Geiger et al. |
| 6,460,050 | B1 | 10/2002 | Pace et al. |
| 7,246,370 | B2 | 7/2007 | Valente et al. |
| 7,451,488 | B2 | 11/2008 | Cooper et al. |
| 7,506,155 | B1 | 3/2009 | Stewart et al. |
| 7,552,136 | B2 * | 6/2009 | Kelley et al. |
| 8,074,256 | B2 | 12/2011 | Valente et al. |
| 2005/0108655 | A1 * | 5/2005 | Andrea et al. ............... 715/798 |
| 2006/0107231 | A1 * | 5/2006 | Matthews et al. ........... 715/788 |
| 2006/0117385 | A1 | 6/2006 | Mester et al. |
| 2007/0067735 | A1 * | 3/2007 | Hawley et al. ............... 715/792 |
| 2007/0101297 | A1 | 5/2007 | Scott et al. |
| 2008/0034317 | A1 * | 2/2008 | Fard et al. ................... 715/781 |
| 2008/0109870 | A1 | 5/2008 | Sherlock et al. |
| 2008/0115081 | A1 * | 5/2008 | Sankaravadivelu et al. . 715/783 |
| 2008/0115218 | A1 | 5/2008 | Jeffries et al. |
| 2008/0140448 | A1 * | 6/2008 | Hernandez et al. ............. 705/2 |
| 2010/0067390 | A1 | 3/2010 | Pereira Valente et al. |
| 2010/0077338 | A1 * | 3/2010 | Matthews et al. ........... 715/779 |
| 2010/0100964 | A1 | 4/2010 | Mahaffey et al. |
| 2010/0223664 | A1 | 9/2010 | Naranjo et al. |
| 2010/0229096 | A1 * | 9/2010 | Maiocco ............... G06F 15/173 715/734 |
| 2010/0257576 | A1 | 10/2010 | Valente et al. |
| 2011/0131659 | A1 * | 6/2011 | Jeffries et al. ................. 726/25 |
| 2011/0225266 | A1 * | 9/2011 | Douglas et al. .............. 709/219 |
| 2011/0225622 | A1 | 9/2011 | Pearcy et al. |
| 2012/0198511 | A1 * | 8/2012 | Sarferaz ........................... 726/1 |
| 2012/0240076 | A1 * | 9/2012 | Tuang et al. ................. 715/781 |
| 2012/0317491 | A1 * | 12/2012 | Wong et al. ................. 715/736 |

OTHER PUBLICATIONS

International Search Report and Written Opinion for International Application No. PCT/US2012/054192 dated Dec. 26, 2012 (9 pages).
International Preliminary Report on Patentability for International Application No. PCT/US2012/054192, dated Mar. 12, 2014, 5 pages.
Apr. 14, 2015 Notice of Reasons for Rejection in JP Application No. 2014-529903, with English translation, 5 pages.
Supplementary European Search Report in EP Application No. EP 12 83 0060, dated Jun. 3, 2015, 7 pages.
Office Action and Search Report in CN Application No. 201280048156.6, dated Nov. 26, 2015, with English translation, 29 pages.
Notice of Preliminary Rejection in KR Application No. 10-2014-7007143, dated Dec. 29, 2015, no English translation, 4 pages.
Office Action and Search Report in CN Application No. 201280048156.6, dated Jun. 24, 2016, with English translation, 7 pages.
Notice of Reasons for Rejection in JP Application No. 2016-002076, dated Nov. 22, 2016, with English translation, 5 pages.
Decision for Grant in JP Application No. 2016-002076, dated Jun. 27, 2017; Partial English translation with translation of all claims, 5 pages.

* cited by examiner

One collapsed portlet, two open portlets

Two collapsed portlets, one open portlet

Three collapsed portlets

Two collapsed portlets, open portlet between

COMPUTER SYSTEM SECURITY DASHBOARD

This patent application claims the benefit of priority under 35 U.S.C. § 120 of U.S. Provisional Patent Application Ser. No. 61/531,936, filed Sep. 7, 2011, entitled "COMPUTER SYSTEM SECURITY DASHBOARD", which is expressly incorporated herein by reference in its entirety.

TECHNICAL FIELD

This disclosure relates in general to the field of computer security and, more particularly, to visualizing security status of computer systems.

BACKGROUND

The Internet has enabled interconnection of different computer networks all over the world. The ability to effectively protect and maintain stable computers and systems, however, presents a significant obstacle for component manufacturers, system designers, and network operators. A wide variety of products and services have been developed and adopted by organizations to monitor and manage security of computing systems. Such security products can include security tools such as antivirus tools, antimalware tools, security policy compliance monitors, firewalls, network security tools, virtualization security tools, email security tools, etc. Typically, enterprises adopt combinations of such security tools according to the priorities and demands of the organization. User interfaces of these tools can present various metrics and representations of security results for use by administrators in monitoring, analyzing, and managing aspects of a computer system's security.

BRIEF DESCRIPTION OF THE DRAWINGS

Like reference numbers and designations in the various drawings indicate like elements.

DETAILED DESCRIPTION OF EXAMPLE EMBODIMENTS

Overview

Figure 1:
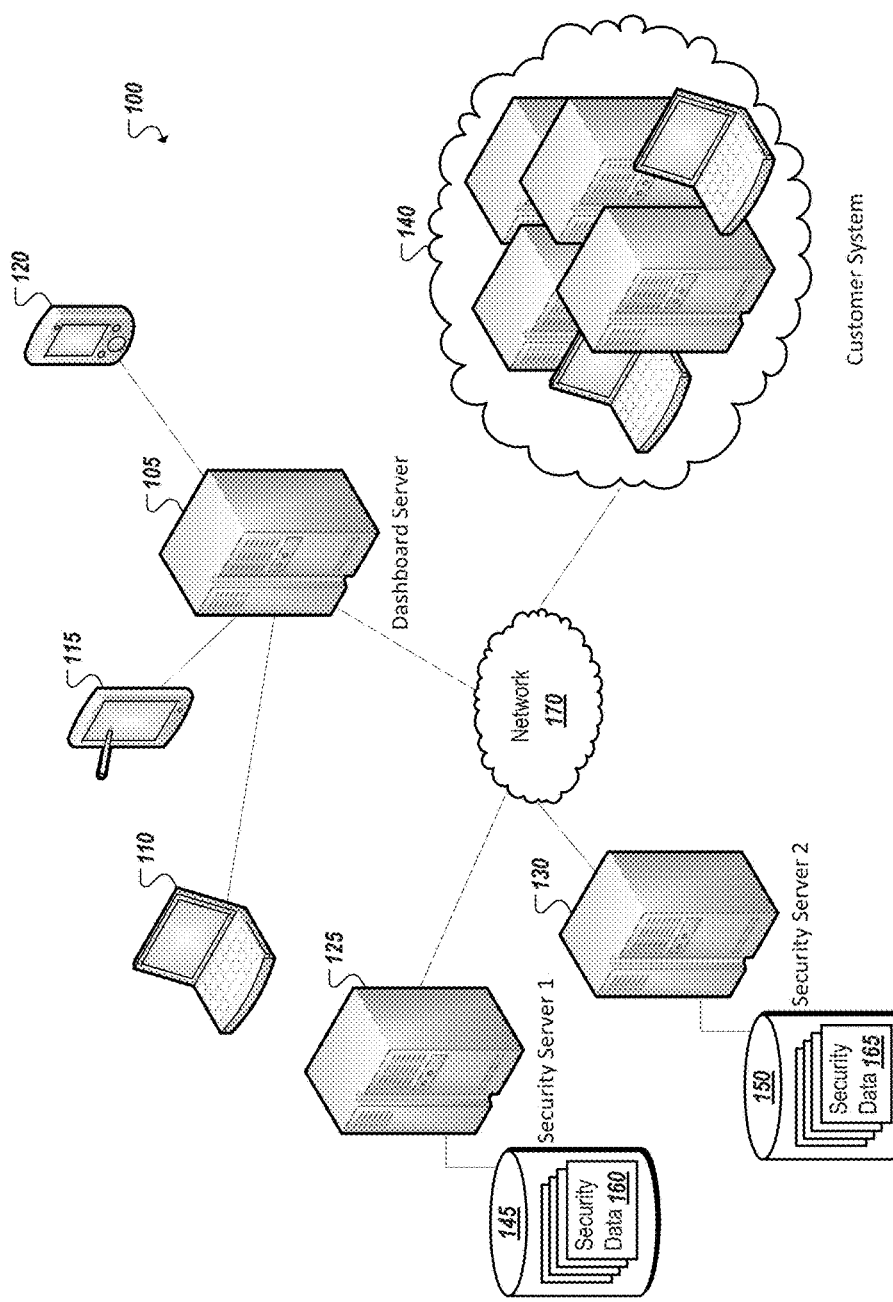
FIG. 1 is a simplified schematic diagram of a computing system including one or more security tools in accordance with one embodiment.

In general, one aspect of the subject matter described in this specification can be embodied in methods that include the actions of providing a computing system security dashboard for presentation on a computer display device, the dashboard including a plurality of security view panes. Each security view pane, when expanded, can present a respective visualization of security conditions of a particular computing system. When the particular security view pane is collapsed it can hide at least a portion of particular visualizations of security conditions presented using the particular security view pane when expanded. The particular security view pane can occupy a smaller area of the dashboard when collapsed than when expanded. A particular visual indicator can be presented on the particular security view, at least when collapsed, summarizing at least a portion of the particular security conditions identified in the particular visualizations. A user interaction with the particular collapsed security view pane can be identified prompting the particular security view pane to be expanded in area and present the particular visualizations.

Further, in another general aspect, a system can be provided including at least one processor device, at least one memory element, and a dashboard engine. The dashboard engine, when executed by the processor, can provide a computing system security dashboard for presentation on a computer display device, the dashboard including a plurality of security view panes, and can further identify user interactions with security view panes in the dashboard. Each security view pane, when expanded, can present a respective visualization of security conditions of a particular computing system. When the particular security view pane is collapsed it can hide at least a portion of particular visualizations of security conditions presented using the particular security view pane when expanded. The particular security view pane can occupy a smaller area of the dashboard when collapsed than when expanded. A particular visual indicator can be presented on the particular security view, at least when collapsed, summarizing at least a portion of the particular security conditions identified in the particular visualizations. A user interaction with the particular collapsed security view pane can be identified prompting the particular security view pane to be expanded in area and present the particular visualizations.

These and other embodiments can each optionally include one or more of the following features. The particular visual indicator can identify the presence of a representation of (or other data pertaining to) a particular security condition in the particular visualization. The particular security condition can be at least one of a critical security event, abnormality, vulnerability, or threat detected by at least one security tool. The particular visual indicator can be a stoplight indicator presented in red for detection of at least one negative security condition and presented in green in the absence of at least one detected negative security condition. The particular visual indicator can identify the absence of at least one negative security condition within the particular computing system. The particular visualization of the particular security view pane can include an interactive visualization of particular security conditions. Interaction with the particular visualization by a user can cause another visualization of the particular security conditions to be presented within the particular security view pane. The particular visualization can represent the particular security conditions at a first level of abstraction and the other visualization represents the particular conditions at a second level of abstraction. Interaction with the particular visualization can include user inputs in connection with the performance of a particular security task. Indeed, interaction with the particular visualization can cause at least on interface to populate the particular security view pane, the interface adapted to receive the user inputs. A plurality of the security view panes included in the dashboard can be in an expanded state. A plurality of the security view panes included in the dashboard can be in a collapsed state. Each security view pane in the plurality of collapsed security view panes can include a respective visual indicator summarizing at least a portion of the particular security conditions identified in visualizations of the corresponding security view pane. Each visual indicator can mimic a visualization technique used in visualizations of the corresponding security view pane. Further, at least one visual indicator of the plurality of collapsed security view panes can be of a type different from that of the particular visual indicator.

Further, embodiments can include one or more of the additional, following features. The plurality of security view panes can include a user-selected subset of security view panes from a set of available security view panes. A user interaction with the particular security view pane can be identified. The positioning of the particular security view pane can be changed relative to at least one other security view pane in the plurality of security view panes based on the user interaction. Changing the positioning of the particular security view pane can cause at least one other security view pane in the plurality of security view panes to be repositioned to accommodate the changing of the positioning of the particular security view pane. The user interaction can move the particular security view pane to a primary viewing area included in the dashboard. Positioning a security view pane within the primary viewing area can cause the security view pane to be expanded horizontally. The primary viewing area can occupy a position substantially near the top of the dashboard. The primary viewing area can be adapted to collapse when not occupied by at least one security view pane. The dashboard engine can be further adapted to provide a primary viewing area in the dashboard. A dashboard engine can also interface with one or more security tools adapted to perform one or more security tasks, and the dashboard engine can be further adapted to allow users to initiate the one or more security tasks via the particular security view pane.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example embodiment of a computing system 100 including a dashboard server 105 adapted to provide a security dashboard for display on one or more client endpoint devices 110, 115, 120 providing information concerning the status of one or more target systems (e.g., 140). Dashboard server 105, in some implementations, can operate in connection with one or more security servers 125, 130 and be used to present an improved security dashboard to users to help administrators manage security of one or more target systems 140. Security tools hosted, for example, by security servers 125, 130 can generate and collect security data (e.g., 160, 165) in connection with the performance of a variety of security tasks performed on computing devices, network elements, private networks, software, security countermeasures, and other devices, software, systems, and computing resources within a target system 140. Dashboard server 105 can be used to generate infographics and interactive presentations from security data 160, 165 to convey system security status information conveniently and visually to administrators of the target system. In some instances, one or more of security servers 125, 130, clients 110, 115, 130, and dashboard server 105 can be remote from and communicate over one or more networks 170 with target system 140, as well as other system components (e.g., other servers, client devices, etc.).

In general, "servers," "clients," "devices," "endpoints," "computers," and "computing devices" (e.g., 105, 110, 115, 120, 125, 130, 140), and as used herein, can comprise electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 105, 110, 115, 120, 125, 130, 140) can each include one or more processors, computer-readable memory, and one or more interfaces. Servers can include any suitable software component or module, or computing device(s) capable of hosting and/or serving software applications and other programs, including distributed, enterprise, or cloud-based software applications. For instance, application servers can be configured to host, serve, or otherwise manage web services or applications, such as SOA-based or enterprise web services, or applications interfacing, coordinating with, or dependent on other enterprise services, including security-focused applications. In some instances, some combination of servers can be hosted on a common computing system, server, or server pool, and share computing resources, including shared memory, processors, and interfaces, such as in an enterprise software system serving services to a plurality of distinct clients and customers.

Computing devices (e.g., 105, 110, 115, 120, 125, 130, 140) in system 100 can also include devices implemented as one or more local and/or remote client or endpoint devices, such as personal computers, laptops, smartphones, tablet computers, personal digital assistants, media clients, web-enabled televisions, telepresence systems, and other devices adapted to receive, view, compose, send, or otherwise participate in the management of computing system security. A client or endpoint devices can include any computing device operable to connect or communicate at least with servers, other endpoint devices, network 170, and/or other devices using a wireline or wireless connection. Each endpoint device can include at least one graphical display device and user interface devices, allowing a user to view and interact with graphical user interfaces of computer security tools and other software. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

Endpoint devices (e.g., 110, 115, 120) can include one or more user interface devices, such as a keypad, touch screen, mouse, or other device that can accept information and output devices, such as monitors, touchscreens, and other devices that conveys information associated with operations and functionality of tools, services, and applications provided through system 100. Graphical user interfaces (or GUIs) of software-based tools, services, and applications provided through system 100 can allow the user to interface with at least a portion of environment 100 for any suitable purpose, including allowing a user to interact with one or more software applications, including computer security tools and a system security dashboard aggregating information collected and generated from such tools. Generally, a GUI provides users with an efficient and user-friendly presentation of data provided by or communicated within the system. The term "graphical user interface," "user interface," or "GUI, may be used in the singular or in the plural to describe one or more graphical user interfaces and each of the displays and controls of a particular graphical user interface. Therefore, a GUI can be any graphical user interface, such as a web browser, touch screen, or command line interface (CLI) that processes information in the environment 100 and efficiently presents the results to the user. In general, a GUI can include a plurality of user interface elements such as interactive fields, pull-down lists, media players, tables, graphics, virtual machine interfaces, buttons, etc. operable by the user at an endpoint device. Such user interface elements may be particularly related to and adapted for the functions of a system security dashboard or particular panes, views, and windows included within implementations of a system security dashboard.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Modern security administrators can employ a variety of tools and functionality in connection with managing and analyzing security status of one or more computing systems. Security tools have been developed that can provide focused and robust data and analysis describing conditions within a system, including the automated detection of important security alerts, events, threats, vulnerabilities, and other conditions. A variety of different and useful interfaces, views, data presentations, representations, and infographics can be provided and generated in connection with a suite or other collection of security tools used in a modern system security environment. However, given the wide variety and number of tools, functionality, views, and analyses generated and available to security administrators using a system security environment, administrators can quickly become overwhelmed with the deluge of data available to them. Dashboards that attempt to summarize such information to users can be similarly overwhelming, as it can be very difficult to effectively present, in a single interface, all of the information and views pertaining to a system's security and security tools to an administrator at a given time and in a manner that allows the user to conveniently multitask and monitor several aspects of a system's security. Consequently, previous systems tended to compromise on the comprehensiveness of data presented to an administrator in an attempt to simplify presentations of security status data to the administrator. Such techniques, however, can result in other important security status data not being presented to the user in sufficient detail, or at all. On the other hand, more comprehensive security interfaces can cause important security events to get lost in a crowd of information, or to be presented off-screen (e.g., forcing a user to have to scroll down the interface window or toggle to different pages or interfaces to view the information).

Figure 2:
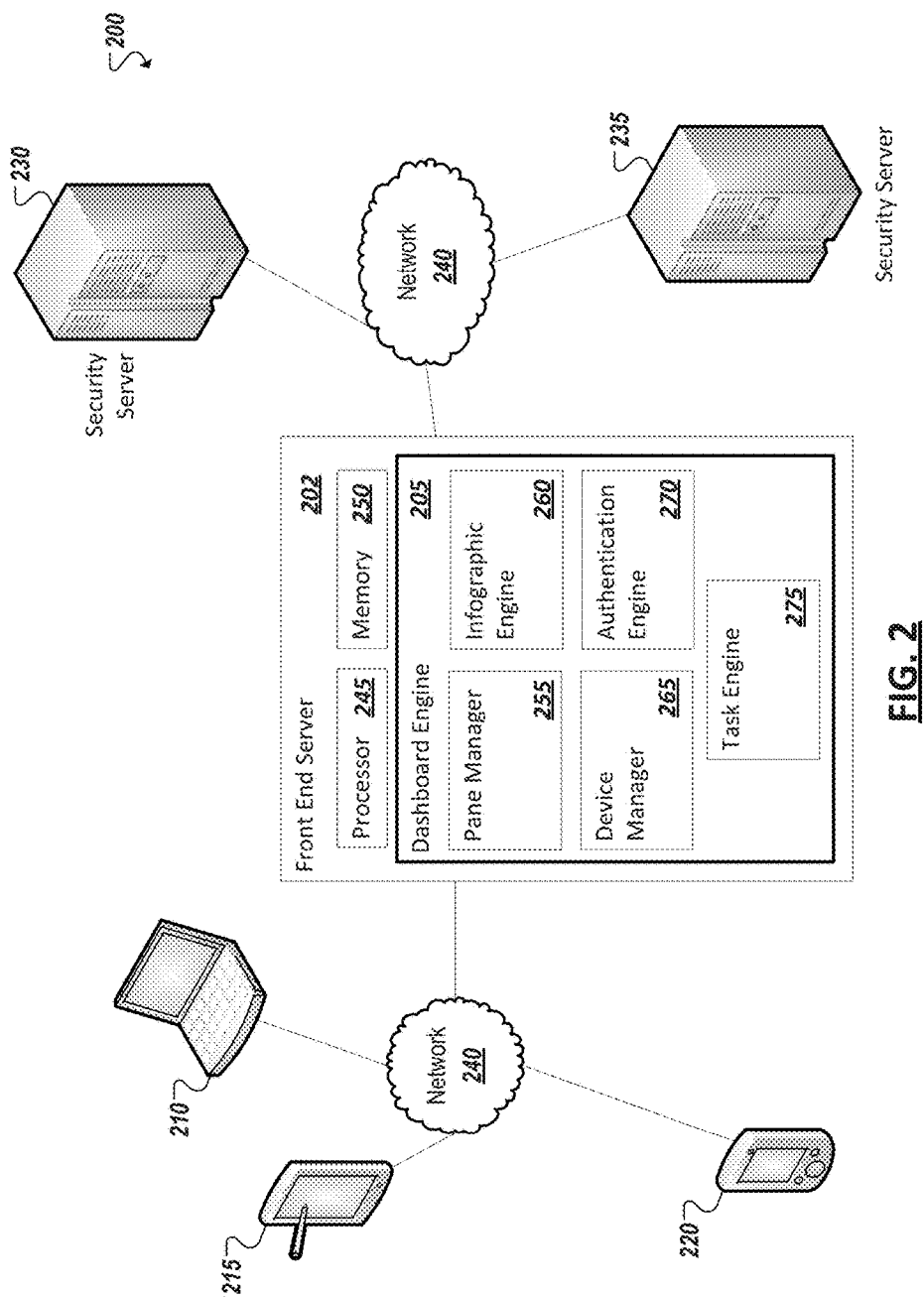
FIG. 2 is a simplified block diagram of an example system including at least one tool adapted to generate a security dashboard user interface in accordance with one embodiment.

Computing system 100, in some implementations, can resolve many of the issues identified above pertaining to in adequate security status interfaces. For instance, improved system security dashboards can be generated and provided with functionality giving administrator-users more control and presenting information in a more manageable and streamlined fashion, among other features and advantages. As an example, in the schematic representation 200 of FIG. 2, a front end server 202 is shown for providing end-users (e.g., at devices 210, 215, 220) interfaces and access to security tools, such as tools served by security servers 230, 235 monitoring one or more target computing systems. Front end server 202 can include one or more processors 245 and memory 250, as well as a dashboard engine 205 adapted to generate a security dashboard providing a plurality of security status views to an administrator based on data, analysis, and results performed or provided by security servers 230, 235. Dashboard engine 205 can include a pane manager 255, infographic engine 260, device manager 265, authentication engine 270, and task engine 275, among other modules, functionality, and combinations of the foregoing.

Dashboard engine 205 can be adapted to develop interactive dashboard interfaces capable of being rendered and presented on one or more different endpoint devices, including different types of endpoint devices (e.g., 210, 215, 220). Interactive dashboards generated by dashboard engine can be dynamically customizable by user-administrators, allowing an administrator to have important security status summaries presented to the administrator, while concurrently allowing the administrator the option to "drill-down" into the data and details of particular security status views, for instance, in an attempt to diagnose or remedy a particular security issue identified using the dashboard. Each of the plurality of computer security views can be presented in one or more particular windows, or panes, presented within the dashboard user interface or window. For instance, FIGS. 3A-3B illustrate screenshots 300*a-b* of an example security dashboard 305 capable of being generated using dashboard engine 205.

Figure 3A:
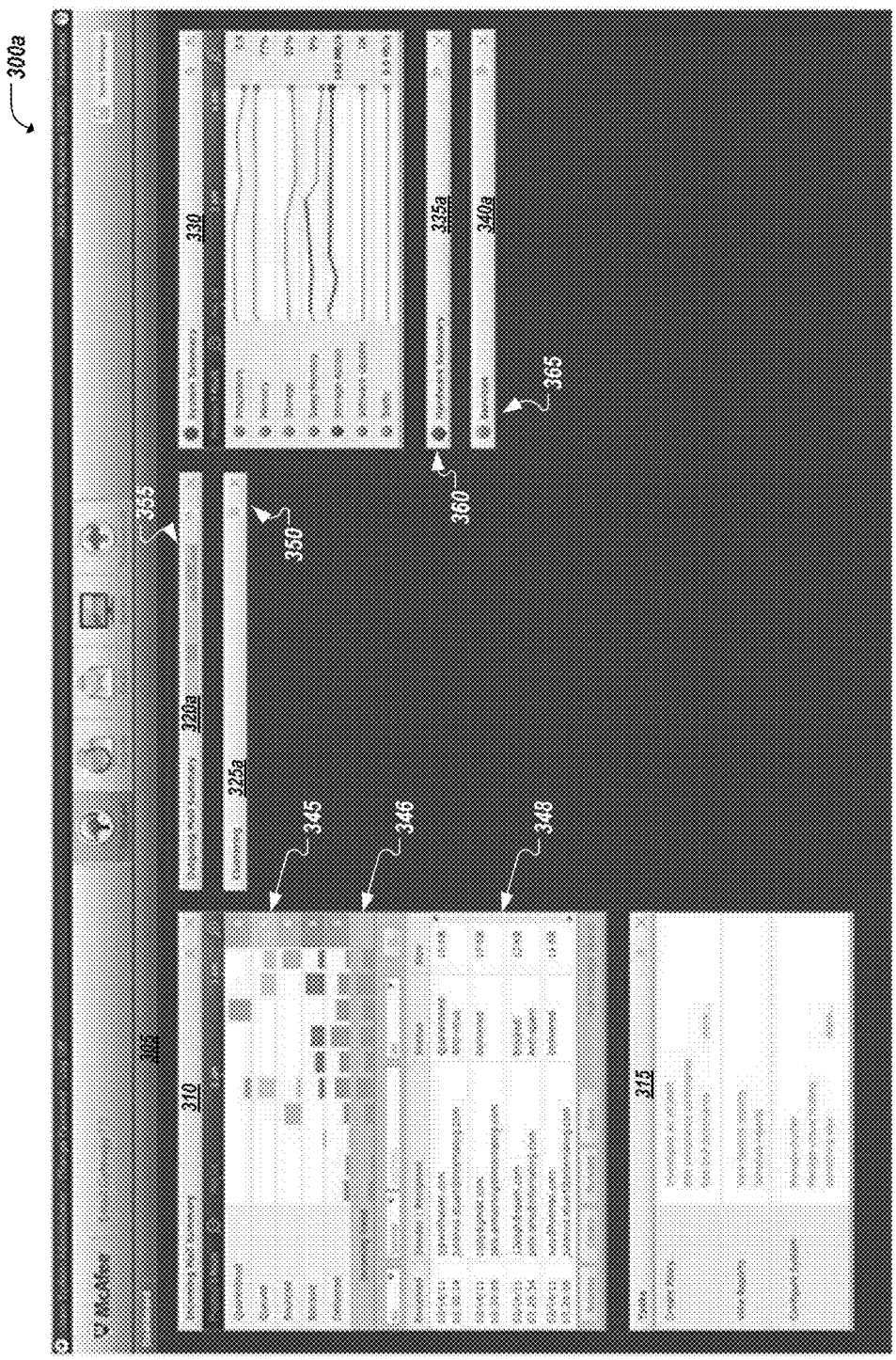
FIGS. 3A-3B are screenshots of an example security dashboard user interface in accordance with one embodiment.
Figure 3B:

As shown in FIG. 3A, a security dashboard can include a plurality of interactive panes 310, 315, 320, 325, 330, 335, 340, each presenting a view of security status information corresponding to a particular system. Views presented in the dashboard panes can relate to certain security considerations, threats, vulnerabilities, etc. of one or more different system components or subsystems. As an example, pane 310 can include views of incoming email traffic within a system, as well as the status thereof. Pane 310 is expanded, in each of the screenshots of FIGS. 3A-3B, showing an infographic 345 illustrating the number of quarantined, queued, bounced, blocked, and delivered emails received chronologically over a period of time (e.g., 1:00 AM to 3:00 AM). Panes can include multiple views, as in the example of pane 310 including a graph 346 showing overall incoming email traffic, and a sortable table 348 showing details of individual emails corresponding to the email traffic modeled in the views of infographic 345.

As shown in example pane 310 of FIG. 3A, views (e.g., 345, 346, 348) organized and presented in a particular dashboard pane (e.g., a pane relating to a particular security status type, such as incoming email of a system as in pane 310) can provide robust and varied information including alternate presentations and visualizations of the information to users managing security of a system. In some instances, however, the level of detail provided by a particular expanded pane can provide more information, and information at a higher level of detail, than is immediately desired by a particular user. Accordingly, in some implementations, at least some panes in a security dashboard 305 can be collapsible, so as to be at least partially minimizing. For instance, in the example of FIG. 3A, panes 320, 325, 335, 340 are shown in a collapsed state.

By allowing certain dashboard panes to be selectively and dynamically collapsed (and, alternatively, expanded) administrators can have better control over what information is presented to the user at a given time. For instance, having several robust views presented in multiple expanded dashboard panes can overwhelm the user with too many different views and details relating to potentially distinct and independent security status issues. While robust security views can, in isolation, be particular useful, too many can overwhelm or distract users, thereby reducing the overall usefulness of the dashboard. This can be particular problematic when the complexity of a dashboard inhibits an administrator from reacting swiftly to time-sensitive security issues and notifications presented using the dashboard. Additionally, given the variety of security status information, tasks, issues, tools, and considerations available to administrators using suites and combinations of modern security tools, space within a security dashboard can be limited and may not allow all of the relevant security views to be concurrently presented or available to an administrator, again threatening the administrator's potential effectiveness recognizing, diagnosing, and remedying security issues as they develop. Accordingly, by providing collapsible panes and security views, more panes can be included within a single dashboard user interface, potentially negating users having to scroll around or page through views of a dashboard in order to see the entirety of the dashboard and views and panes of interest to the administrator.

Figure 4A:
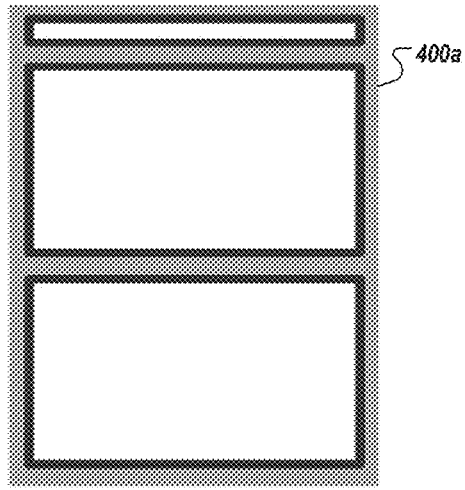
FIGS. 4A-4D are block representations of example user interfaces for one or more computer security tools in accordance with at least some embodiments.
Figure 4B:
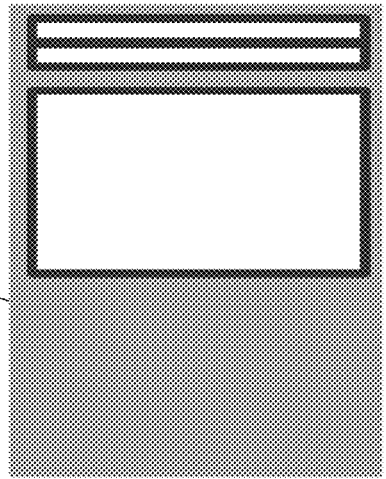
Figure 4C:
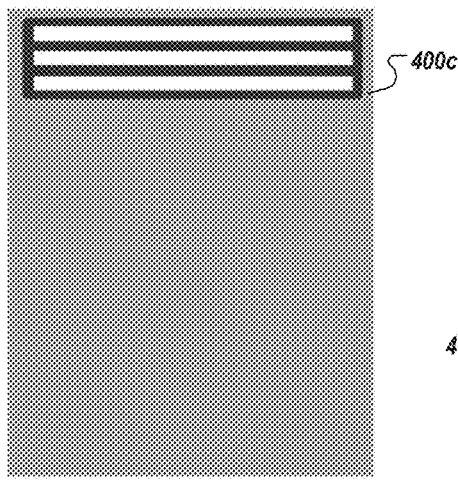
Figure 4D:
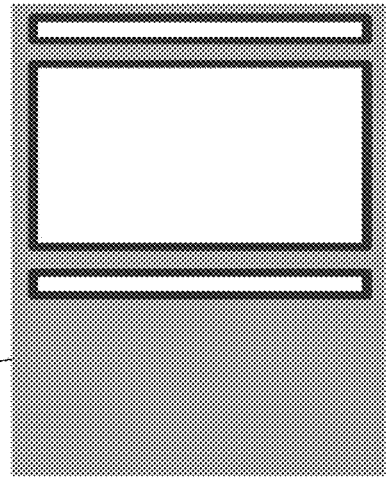

As shown in FIG. 3B, as users determine that they desire to view more of the content and views of a particular pane, users can interact with the dashboard and elect to expand or maximize or otherwise expand collapsed panes. For instance, each of panes 320, 325, 335, 340, collapsed in FIG. 3A, are shown in their expanded form in FIG. 3B. In some implementations, users can control whether a pane is expanded or collapsed using a control, such as control 350. Additionally, not only can collapsed panes be expanded, expanded panes can be selectively collapsed, effectively minimizing the pane. As illustrated in the schematic representations 400a-d of FIGS. 4A-4D, dashboard panes can be collapsed and expanded in a variety of combinations according to the selections of the user. Indeed, all dashboard panes can be concurrently collapsed (as in FIG. 4C) or expanded (such as in FIG. 3B).

Simply minimizing a security pane or view, however, can be potentially hazardous, as it can result in important security issues and trends being missed. Further, it can be difficult, if not impossible, in some instances, for a given user to accurately anticipate or predict when a particular security view should be observed. Accordingly, it can be ideal to concurrently present at least partial views of each security pane within a security dashboard 305. Given that screen space can be scarce within the dashboard, rather than opening or maximizing each pane in a dashboard, in some implementations, security summary information, infographics, or other security status indicators can be provided and presented within a pane in its collapsed form. While such collapsed indicators may not provide the level of detail available within the expanded pane, such collapsed indicators can nonetheless provide an abbreviated overview of particular security status information included in expanded views of the pane that can be used to alert administrators abnormalities or issues pertaining to aspects of system security addressed in the pane.

To illustrate, in FIG. 3A, collapsed panes 320, 335, 340 can include overview indicators 355, 360, 365 that provide general visual summaries of important events and trends described within the body of the pane when expanded. For instance, collapsed pane 320 includes a miniaturized trendline indicator 355 corresponding to aggregate outgoing traffic trendline view 370 included within the body of expanded pane 320b shown in FIG. 3B. While an administrator may not have immediate access to all of the details and views of expanded pane 320b, an administrator can nonetheless observe general conditions and status described in the collapsed body of the pane 320a by virtue of overview indicator 355. Indeed, observing overview indicators can prompt a user to expand the pane to investigate conditions and additional details illustrated in the pane's expanded views (such as shown in pane 320b in FIG. 3B). Likewise, collapsed panes 335a, 340a can also include overview indicators that can allow a user to "peek" into the security status conditions illustrated in the hidden views of the collapsed pane (e.g., 335a, 340a) while preserving dashboard space for users to view expanded panes (e.g., 310, 315, 330) that may currently be of higher priority to the user.

Figure 5A:
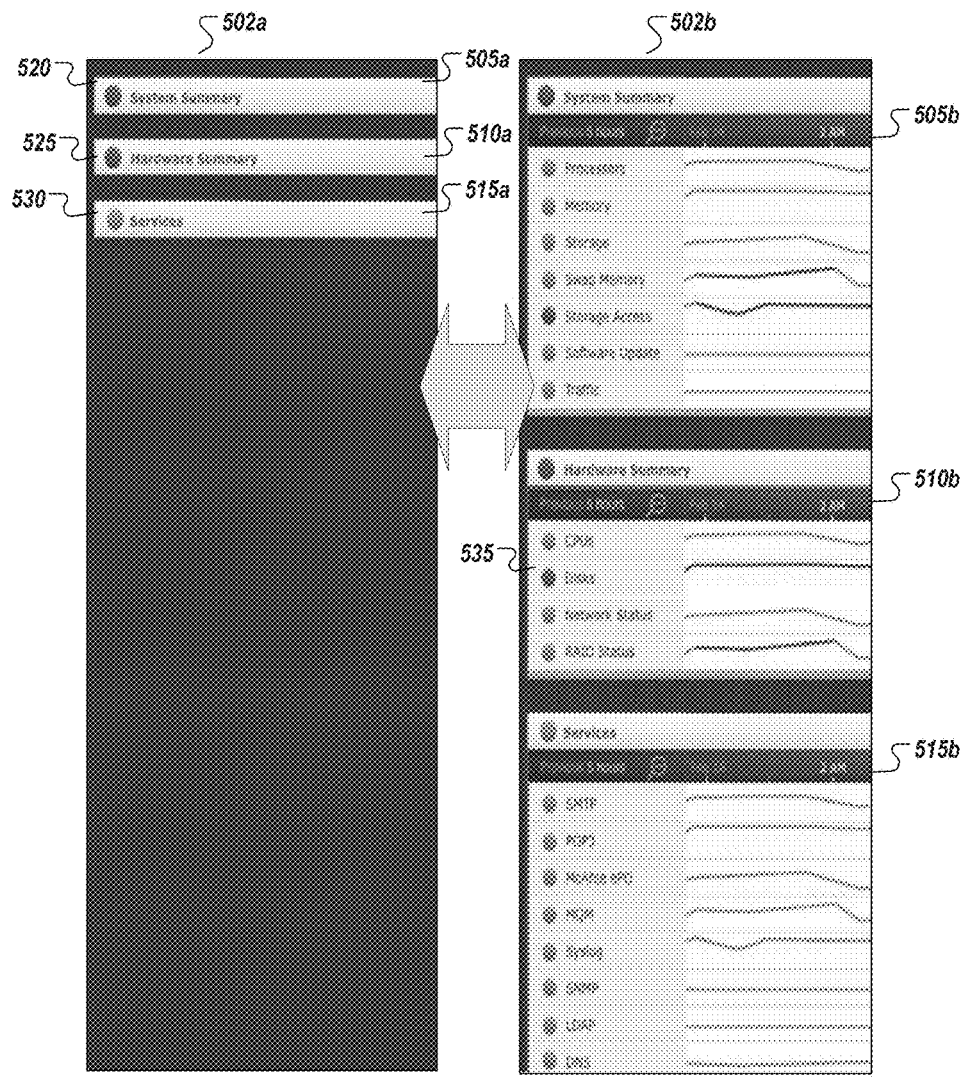
FIGS. 5A-5B are schematic illustrations of example collapsible security user interfaces in accordance with at least some embodiments.
Figure 5B:
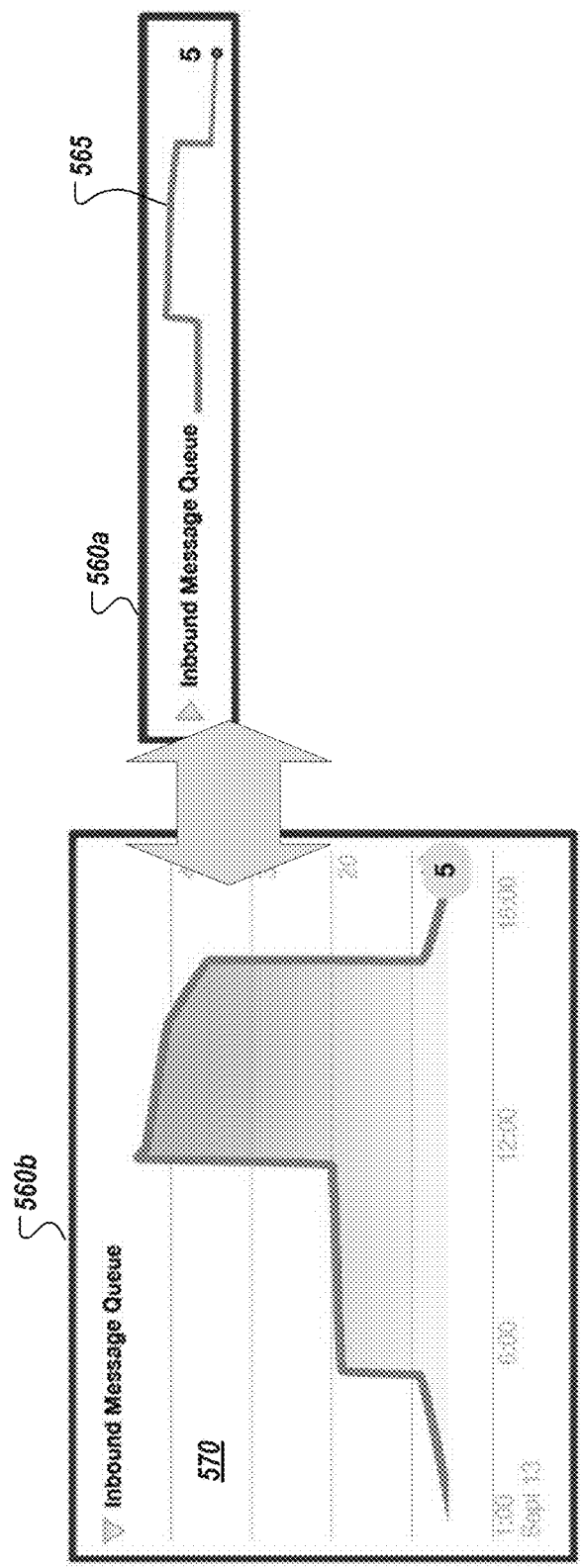

FIGS. 5A-5B are schematic illustrations 500a-b of yet two additional example collapsible security dashboard windows. For instance, in FIG. 5A, a dashboard window 502a including a set of panes 505, 510, 515 is shown, first with the panes in collapsed state (505a, 510a, 515a) and then in expanded state (505b, 510b, 515b). In each of panes 505 and 510, an overview indicator 520, 525 is shown in a first color denoting an error, threat, vulnerability, or other event that is likely of interest to a security administrator. In pane 515, however, overview indicator 530 (of a type similar to overview indicators 520, 525) is shown with a color different than the color of overview indicators 520, 525, the color of overview indicator 530 indicating that no current critical events have been detected (e.g., be security tools running on the target system). As shown in pane 510, describing security status of system hardware, at least one event has been detected (e.g., a problem with disks within the system) indicated by a particular alert indicator 535. This single instance (e.g., at 535) of a negative or critical event (e.g., relating to system disks) within the greater set of hardware security status summaries (e.g., also including security status summaries and trend lines for system CPUs, network status, RAID status, etc.), can trigger an alert overview indicator (e.g., 520, 525) to be presented in the pane in at least its collapsed state (e.g., 505a, 510a) indicating to a user that it may be desirable to expand the panes to further evaluate the detected issues.

FIG. 5B, similar to FIG. 5A, shows a pane 560 alternately in a collapsed state (560a) and expanded state (560b). In the example of pane 560, a trendline infographic is again shown, however, rather than a color-based overview indicator, a miniaturized trendline overview indicator 565 is included in collapsed pane 560a that mimics a full-size trendline-type infographic 570 presented in the pane 560b in its expanded state. As a variety of different pane layouts, infographics, and content can be included within panes used and included within a security dashboard, together with panes addressing and representing a wide variety of security status, a variety of different types and forms of overview indicators can be provided in collapsed panes to assist users in obtaining generalized summaries of security status information represented and presented within panes of a security dashboard.

Returning to FIG. 2, an infographic engine 260 can provide functionality for generating views and infographic content included within the panes, as well as converting security data (e.g., from security servers 230, 235) into infographic representations. Indeed, infographic engine 260 can also be used to provide logic for generating and presenting overview indicators (e.g., 355, 360, 365) in collapsed dashboard panes. Further, a pane manager 255 of dashboard engine 205 can provide logic and functionality for dynamically collapsible dashboard panes, such as shown in FIGS. 3A-4D, as well as other functionality. For instance, in some implementations, users can drag and rearrange dashboard panes within the dashboard window while the dashboard panes present and update security status data and graphics to a user. In addition to permitting users to interact with the dashboard user interface to collapse panes of immediate secondary interest and expand higher priority panes, pane manager 255 can provide UI logic allowing users to reorder, stack, or rearrange panes as they desire so as to optimize viewing of particular panes. Additionally, in some implementations, users can not only rearrange and vertically expand dashboard panes, but also promote panes to a "full screen" pane, resulting in the pane being expanded horizontally across a dashboard window. In other words, dashboard panes can be added, removes, resized, and rearranged during live operation of the security dashboard.

Figure 6C:
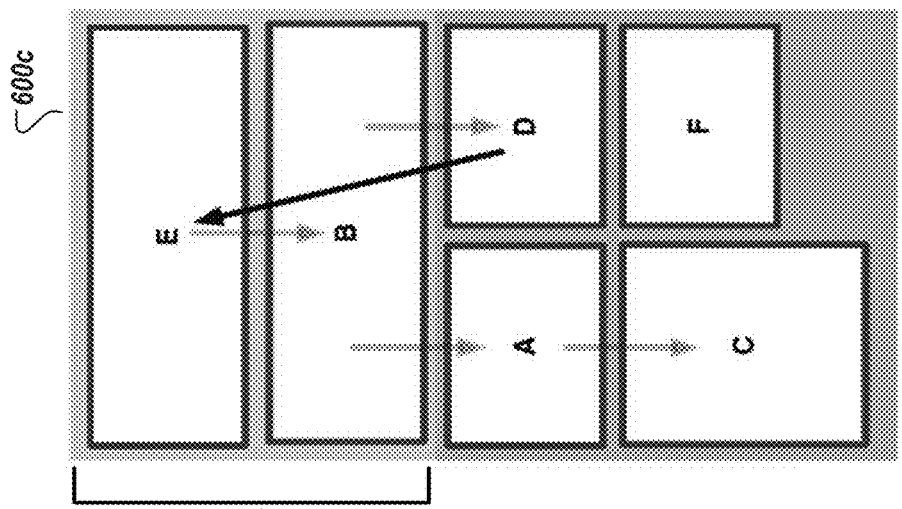
FIGS. 6A-6F are block representations of user interactions with example security user interfaces in accordance with at least some embodiments.
Figure 6B:
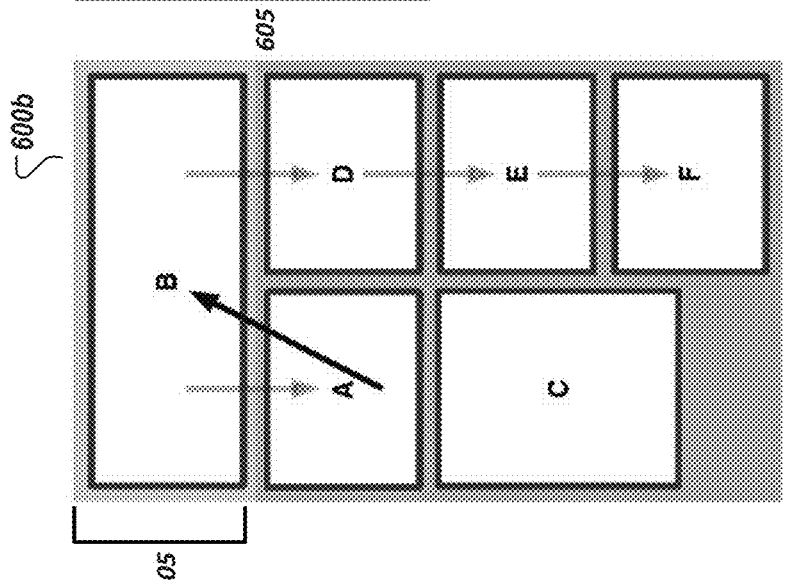
Figure 6A:
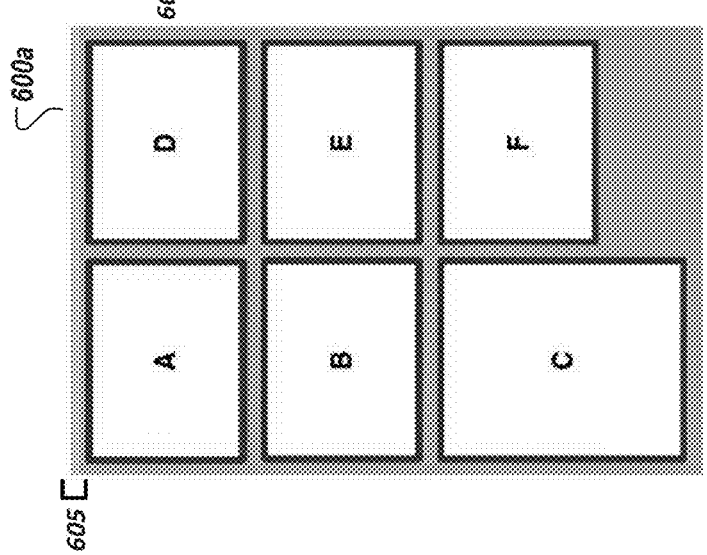

FIGS. 6A-6F are block representations 600a-f of user interactions with example security dashboard windows provided, for instance, using dashboard engine 205 and pane manager 255. In FIG. 6A, an initial dashboard window configuration 600a is shown with six security dashboard panes A-F, each providing corresponding views of security status information for a computing system. In some instances, the number, type, and location of the dashboard panes can be selected by a user. Further, while using the security dashboard to monitor the security status and events of a system, the user can manipulate dashboard panes. Not only can the user collapse and expand panes, the use can, in some implementations, also dynamically rearrange, resize, add, and remove panes from the dashboard window. Additionally, in some implementations, a "full size" viewing option can be provided for horizontally expanding dashboard panes, activated, for instance, by selecting a full-size option or by dragging a pane into a designated area (e.g., 605) of the dashboard window 600. For instance, in FIG. 6B, a user can drag pane B into the primary viewing area 605, resulting in pane B being positioned above the remaining panes in the window 600b and expanding horizontally. In this example case, pane B expands across the width of the dashboard window 600b in response to being dragged and dropped into the primary viewing area 605. Additionally, moving pane B from its original position (in FIG. 6A) to its new position (in FIG. 6B) can result in other panes being automatically relocated to accommodate pane B's change of position. For instance, in the example of FIG. 6B, panes A, D, E, and F are pushed downward by the repositioning of pane B within the primary viewing area 605. Moreover, in some implementations, if no pane is positioned within a defined primary viewing area 605 within a dashboard interface, the primary viewing area 605 can be collapsed or hidden (such as in FIG. 6A), until a pane is placed near, at, or within the primary viewing area.

Figure 6F:
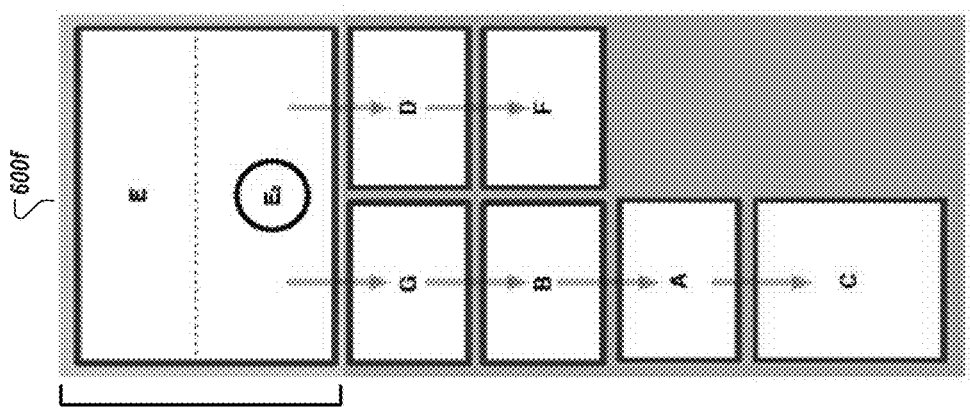

In some implementations, more than one dashboard pane can be positioned within the primary viewing area 605 at a given time. For example, in FIG. 6C, pane E is also moved into primary viewing area 605 with pane B. This may be desirable, for instance, when the content of more than one pane is the focus of a user, such as when the security information presented and synthesized within panes B and E bear an important relation to each other, for instance, in connection with a particular security event being monitored by the user. Accordingly, the user may desire to expand panes B and E and, at least temporarily, make these panes the focal point of the dashboard window 600c. In some instances, rather than having multiple panes occupy the primary view area 605, a user can replace pane B with pane E, and cause pane B to revert back to its default horizontal width, as shown in FIG. 6D. The removal of pane B from primary viewing area 605 can be caused by the user dragging pane B out of the primary viewing area 605 or by selecting a control or option to return pane B to its original horizontal width and/or position. Moreover, in some implementations, primary viewing area 605 can limit the number of different panes that can be included in the viewing area at a given time. In such implementations, the positioning of a pane (e.g., pane E) might cause a pane (e.g., pane B), previously positioned within the viewing area 605, to be automatically removed from the primary viewing area 605 to accommodate the newly-positioned pane.

Figure 6E:
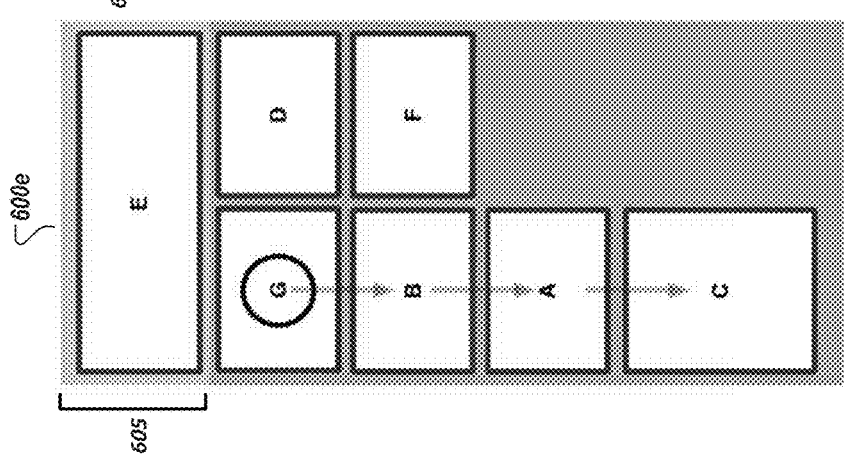
Figure 6D:
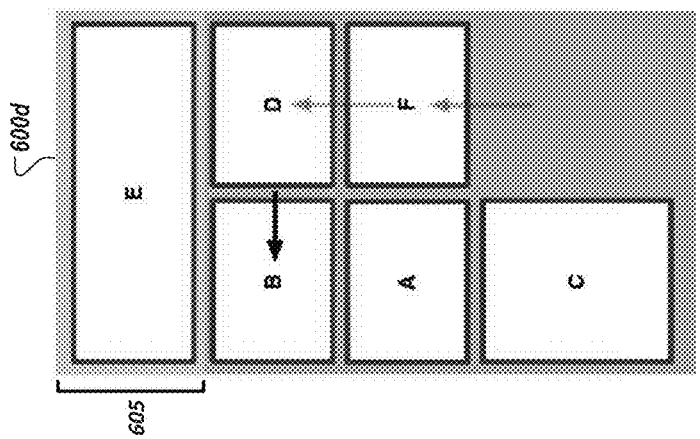

Turning to FIG. 6E, panes can be added or removed from dashboard window 600 in response to user commands and interactions and while the user views and manages system security using the security dashboard. For example, as shown in FIG. 6E, a new pane G can be selected by a user to be added, at least temporarily, to dashboard window 600e. The user can add or remove panes from the dashboard window in connection with the management of system security, allowing the user to observe and focus on particular security settings and information provided using the various panes according to the activities and goals of the user at a given time. Such panes can be selected from a set of panes larger than would be available to be conveniently included within a dashboard interface at a given time. The new pane G can also be positioned and re-positioned within dashboard window 600e according to the preferences of the user. Accordingly, as in other examples, the addition of new panes (e.g., pane G) to the dashboard window 600, as well as the removal of pre-placed panes (e.g., panes A-F) from the dashboard window 600, can result in the repositioning of the remaining panes, as is shown in FIG. 6E.

Turning now to FIG. 6F, panes can be expanded vertically, as well as horizontally, including expanding the pane beyond the expansion that occurs when expanded a pane from a collapsed state to an expanded state. For instance, user interactions with views in an expanded pane can result in new views populating or being added to the pane, such as new views presenting security data at a more detailed level of abstraction or using alternative or supplemental infographics. Interactions with pane content can also cause additional views or interfaces to be launched that can be used by the user to edit or modify particular security settings or policies, or to initiate particular security scans, fixes, or other tasks. The pane can expand vertically to accommodate new views and interfaces populating a given pane. For example, as shown in FIG. 6E, a user can cause pane E to be expanded vertically, for instance, in response to the user interacting with views and/or content within pane E, such as an infographic, status identifier, security category, system component, taxonomy, or other selectable control or link included in the pane. Panes not included in primary viewing area 605 can also expand vertically in response to new views and/or interfaces populating the pane in response to user interactions with the pane.

In addition to providing administrator users with the ability to selectively expand dashboard panes and drill-down into data and infographics conveying security status information, in some implementations, dashboard pane can provide users with an interface to access security tool functionality for remedying detected problems and enacting desired countermeasures and system adjustments. For instance, task engine 275 can be used to provide access to or interface with security tools provided, for example, by security servers 230, 235, allowing a user to launch or otherwise perform security tasks related to security status information represented in one or more security dashboard panes. As an example, and returning for convenience to the example of FIG. 5A, a user can attempt to address a detected problem relating to storage access (indicated by user interface element 550 in pane 505b). In some instances, a user can interact with pane 505b and interface element 550 and select the "Storage Access" element, for instance, using a mouse or touchpad, to open additional interfaces for use in changing system configurations, launching a security countermeasure or tool (including interfaces of security tools of security servers 230, 235), editing policy rules, adjusting system settings, and other tasks related to managing storage access in the system. Indeed, such interfaces can be launched within the body of the corresponding pane (e.g., pane 505), for instance, causing the pane to expand to accommodate the security task interface while concurrently showing the security status information giving rise to the user's attempts to remedy the problem (e.g., as shown in FIG. 6F).

Returning to FIG. 2, security dashboard functionality provided in connection with managing the positioning and size of user-selectable security dashboard panes can be managed and provided using pane manager 255. Other modules can be provided for use in connection with additional functionality of a security dashboard. For instance, device manager 265 can be used to automatically detect and adapt presentation of a particular security dashboard to a particular endpoint device. For instance, how panes are initially arranged on a security dashboard can be affected by the dimensions and resolution of a display device used by the particular endpoint device. For example, in a display device with wider dimensions, more columns of panes may be presented in the dashboard than in a display device with narrower dimensions, thereby optimizing the layout of panes within the dashboard. Further, some display devices can dynamically change orientations, such as with modern touch-screen based smartphones and tablet computers with accelerometers or other sensors for identifying display orientation. Accordingly, for such devices, a change in display orientation can cause the orientation and positioning of dashboard panes to be adjusted or changed to optimize the changed orientation, among other examples.

Further, dashboard engine 205, in some implementations, can be a reusable tool or service and can provide or serve security dashboards in connection with security of a plurality of different target systems, as well as a plurality of different security tools and security servers. As dashboard engine 205 can provide multiple security dashboards to multiple different customers, and given the particular sensitivity of individual systems' security, an authentication engine 270 can be provided to authenticate authorized users, organizations, devices, and systems prior to granting access to a particular system's security dashboard. Further, some administrators may only be granted limited access to particular system security information or tools. Accordingly, different permission levels can be provided for different users of a particular system's security dashboard. Authentication engine 270 can be thus adapted to manage authentication of various users as well as the permission levels of the users. For instance, some security panes available to some users (e.g., with higher permission levels) may not be available to other users (i.e., with lower permission levels). Accordingly, certain security panes may not be included in or be available to be added to security dashboards presented to particular users based, for instance, on users' permission levels. This and other functionality relating to authentication and access control of security dashboards, security tools, and particular security dashboard panes can be managed and controlled using an authentication engine (e.g., 270).

Figure 7:
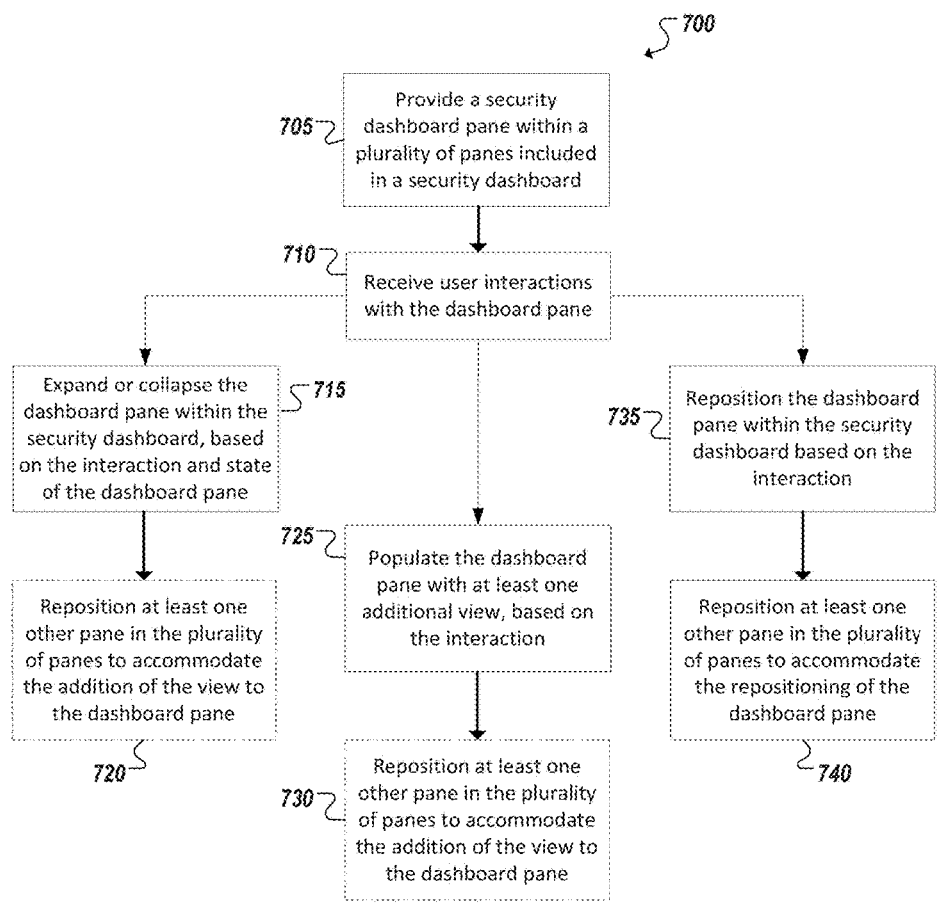
FIG. 7 is a simplified flowchart illustrating example operations associated with at least some embodiments of the system.

FIG. 7 is a simplified flowchart 700 illustrating example techniques for providing an improved security dashboard. For instance, a security dashboard can be provided 705 for presentation to a user on a computer display device. The security dashboard can include a plurality of panes representing computer security status information to the user. The user can interact 710 with one or more panes in the presented security dashboard, including content representing computer security status information. Depending on the type and form of interaction with the security dashboard, and the design (e.g., dimensions, content views, etc.) and functionality of the dashboard pane, the dashboard and/or pane can be altered to accommodate particular security tasks or responsibilities of the user. For instance, the dashboard pane can be collapsed (if already expanded) or expanded (if already collapsed) (at 715) to assist the user in managing the viewing area of the dashboard presented on a display device. In cases where the dashboard pane is collapsed, a collapsed view of the pane can include visual indicators providing a summary view of the pane's content (and related security status information) hidden by the collapsing of the pane. Indeed, the expanding of a collapsed pane can be the result of an overview indicator presented on the collapsed pane alerting the user of a potential alert or other item of interest described in more detail within hidden views of the collapsed pane. Collapsing or expanding (715) the pane can, in some instances, result in the automatic repositioning 720 of other panes in the dashboard (such as shown and described in the examples of FIGS. 3A-4D).

In some instances, such as in connection with, or following, the expanding of a particular pane, a user can interact 710 with representations of system security state presented in views included in the expanded pane, to cause additional views, representations, and/or interfaces to be presented and populated 725 within the pane, such as additional views and interfaces related to the general security category or purpose of the pane. In some instances, populating 725 the pane with additional views or interfaces can cause the dimensions of the pane to expand automatically, in some cases, affecting and automatically repositioning 730 other panes included in the dashboard presentation. In some implementations, interaction with dashboard panes can include the collection of user inputs for use in connection with the performance of one or more security tasks in connection with security conditions represented in the dashboard pane.

Collapsed or expanded dashboard panes can be repositioned and rearranged (735) within a dashboard presentations in response to user interactions with the dashboard and/or affected panes. For instance, a user can interact 710 with a particular dashboard pane by selecting the pane and dragging and dropping the particular pane to a different location within the dashboard (e.g., using a mouse or touchpad display, etc.) to reposition 735 the particular pane within the plurality of panes presented in the dashboard. Further, repositioning one dashboard pane can cause other dashboard panes in the plurality of dashboard panes to be repositioned 740 to accommodate the moving (or, in some cases, addition or removal) of a particular dashboard pane in response to a user interaction 710.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions, when executed on a machine, cause the machine to:
   receive data describing security conditions detected in a particular computing system by one or more security sensors;
   provide a computing system security dashboard for presentation on a computer display device, the dashboard including a plurality of security view panes, each security view pane, when expanded, presenting a respective visualization of a corresponding category of security conditions of the particular computing system, wherein at least one particular security view pane is collapsed so as to hide at least a portion of a particular visualization of particular security conditions related to a particular category,
   the particular security view pane is to occupy a smaller area of the dashboard when collapsed than when expanded and is to present a particular visual indicator, at least when collapsed, summarizing at least a portion of the particular security conditions represented in the hidden particular visualization,
   the particular visualization is to graphically represent chronological progress of the particular security conditions over a period of time and at least one indication of whether a critical event has been detected with respect to the chronological progress of the particular security conditions during at least one portion of the period of time, and the particular security conditions are for each element of the group consisting of processors, memory, storage, storage access, software update, and network traffic; and
   identify a user interaction with the particular collapsed security view pane prompting the particular security view pane to be expanded in area and to present the particular visualization.

2. The storage medium of claim 1, wherein the particular visual indicator identifies representation of a particular security condition in the particular visualization.

3. The storage medium of claim 2, wherein the particular security condition is at least one of a critical security event, abnormality, vulnerability, or threat detected by at least one security tool.

4. The storage medium of claim 2, wherein the particular visual indicator is a stoplight indicator presented in red for detection of at least one negative security condition and presented in green in the absence of at least one detected negative security condition.

5. The storage medium of claim 1, wherein the particular visual indicator identifies absence of at least one negative security condition within the particular computing system.

6. The storage medium of claim 1, wherein the particular visualization of the particular security view pane includes an interactive visualization of particular security conditions.

7. The storage medium of claim 6, wherein an interaction with the particular visualization causes another visualization of the particular security conditions to be presented within the particular security view pane.

8. The storage medium of claim 7, wherein the particular visualization represents the particular security conditions at a first level of abstraction and the other visualization represents the particular conditions at a second level of abstraction.

9. The storage medium of claim 6, wherein interaction with the particular visualization includes inputs in connection with the performance of a particular security task.

10. The storage medium of claim 9, wherein the interaction with the particular visualization causes at least one interface to populate the particular security view pane, the interface adapted to receive the inputs.

11. The storage medium of claim 1, wherein a plurality of the security view panes included in the dashboard are in an expanded state.

12. The storage medium of claim 1, wherein a plurality of the security view panes included in the dashboard are in a collapsed state.

13. The storage medium of claim 12, wherein each security view pane in the plurality of collapsed security view panes includes a respective visual indicator summarizing at least a portion of the particular security conditions identified in visualizations of the corresponding security view pane.

14. The storage medium of claim 13, wherein each visual indicator mimics a visualization technique used in visualizations of the corresponding security view pane.

15. The storage medium of claim 14, wherein at least one visual indicator of the plurality of collapsed security view panes is different from the particular visual indicator.

16. The storage medium of claim 1, wherein the plurality of security view panes comprises a subset of security view panes from a set of available security view panes.

17. The storage medium of claim 1, the instructions when executed on a machine to further cause the machine to:
   identify an interaction with the particular security view pane; and
   change the positioning of the particular security view pane relative to at least one other security view pane in the plurality of security view panes based on the interaction.

18. The storage medium of claim 17, wherein the changing the positioning of the particular security view pane causes at least one other security view pane in the plurality of security view panes to be repositioned to accommodate the changing of the positioning of the particular security view pane.

19. The storage medium of claim 17, wherein the interaction moves the particular security view pane to a primary viewing area included in the dashboard, and positioning a security view pane within the primary viewing area causes the security view pane to be expanded horizontally.

20. The storage medium of claim 19, wherein the primary viewing area occupies a position substantially near the top of the dashboard.

21. The storage medium of claim 19, wherein the primary viewing area is adapted to collapse when not occupied by at least one security view pane.

22. The storage medium of claim 1, wherein the particular visualization is a trendline.

23. A method comprising:
   receiving data describing security conditions detected in a particular computing system by one or more security sensors;

providing a computing system security dashboard for presentation on a computer display device, the dashboard to include a plurality of collapsible security view panes, each security view pane, when expanded, to present a respective visualization of a corresponding category of security conditions of the particular computing system and, when collapsed, to hide at least a portion of the visualization presented when the corresponding security view pane is expanded, each security view pane to occupy a smaller area of the dashboard when collapsed than when expanded, at least a particular one of the plurality of security view panes is to present a particular visualization representing particular security conditions related to a particular category and further present a particular visual indicator, at least when collapsed, summarizing at least a portion of the particular security conditions represented in the hidden particular visualization, the particular visualization graphically represents chronological progress of the particular security conditions over a period of time and at least one indication of whether a critical event has been detected with respect to the chronological progress of the particular security conditions during at least one portion of the period of time, and the particular security conditions are for each element of the group consisting of processors, memory, storage, storage access, software update, and network traffic; and identifying an interaction with the particular collapsed security view pane prompting the particular security view pane to be expanded in area and present the particular visualization.

24. The method of claim 23, wherein the particular visualization is a trendline.

25. A system comprising:
at least one processor device;
at least one memory element; and
a dashboard engine adapted, when executed by the at least one processor device, to
receive data describing security events determined from security conditions detected in a particular computing system by one or more security sensors;
provide a computing system security dashboard for presentation on a computer display device, the dashboard to include a plurality of collapsible security view panes, each security view pane, when expanded, to present a respective visualization of a corresponding category of security conditions of the particular computing system and, when collapsed, to hide at least a portion of the visualization presented when the corresponding security view pane is expanded, each security view pane is to occupy a smaller area of the dashboard when collapsed than when expanded, at least a particular one of the plurality of security view panes is to present a particular visualization representing particular security conditions related to a particular category and further present a particular visual indicator, at least when collapsed, summarizing at least a portion of the particular security conditions represented in the hidden particular visualization, the particular visualization is to graphically represent chronological progress of the particular security conditions over a period of time and at least one indication of whether a critical event has been detected with respect to the chronological progress of the particular security conditions during at least one portion of the period of time, and the particular security conditions are for each element of the group consisting of processors, memory, storage, storage access, software update, and network traffic; and identify an interaction with the particular collapsed security view pane prompting the particular security view pane to be expanded in area and present the particular visualization.

26. The system of claim 25, wherein the dashboard engine is further adapted to provide a primary viewing area in the dashboard, and positioning of one or more security view panes within the primary viewing area causes the one or more security view panes positioned within the primary viewing area to be horizontally expanded.

27. The system of claim 25, wherein the dashboard engine interfaces with one or more security tools adapted to perform one or more security tasks, and the dashboard engine is further adapted to allow initiation of the one or more security tasks via the particular security view pane.

28. The system of claim 25, wherein the particular visualization is a trendline.

* * * * *